United States Patent
Park et al.

(10) Patent No.: US 7,817,616 B2
(45) Date of Patent: Oct. 19, 2010

(54) TIME SYNCHRONIZATION METHOD IN WIRELESS SENSOR NETWORK

(75) Inventors: Jong-hun Park, Suwon-si (KR); Min-seop Jeong, Seoul (KR); Woo-jong Park, Suwon-si (KR); Min-Q Kim, Seoul (KR); Daeyoung Kim, Daejeon (KR); Hyunhak Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 11/650,963

(22) Filed: Jan. 9, 2007

(65) Prior Publication Data

US 2007/0177574 A1    Aug. 2, 2007

(30) Foreign Application Priority Data

Jan. 9, 2006    (KR) .................... 10-2006-0002454

(51) Int. Cl.
*H04J 3/06* (2006.01)
(52) U.S. Cl. ....................................... 370/350; 340/664
(58) Field of Classification Search ................ 370/350, 370/351, 230, 324, 345, 503
See application file for complete search history.

(56) References Cited

U.S. PATENT DOCUMENTS

| 5,257,404 A | * | 10/1993 | Goreham et al. ............ 455/503 |
| 6,192,053 B1 | * | 2/2001 | Angelico et al. ............ 370/448 |
| 6,751,228 B1 | * | 6/2004 | Okamura ..................... 370/412 |
| 2006/0165036 A1 | * | 7/2006 | Chandra et al. ............. 370/329 |
| 2007/0236359 A1 | * | 10/2007 | Wynans et al. .............. 340/664 |

* cited by examiner

*Primary Examiner*—Kent Chang
*Assistant Examiner*—Dinh P Nguyen
(74) *Attorney, Agent, or Firm*—Sughrue Mion, PLLC

(57) ABSTRACT

A time synchronization method in a wireless sensor network, has an upper node that provides back-off scheduling to lower nodes in the wireless sensor network of a hierarchical structure. Each of the lower nodes synchronizes time according to the back-off scheduling based on its local clock. The time synchronous method also allows the number of packets required for synchronization in the wireless sensor network to sharply decrease, and the life time of the network to increase. Additionally, the time synchronous method provides a response packet from a lower node in response to a synchronization packet from an upper node, which is used as a synchronization start packet for secondary lower nodes, so that synchronization in the entire network is rapidly processed.

9 Claims, 4 Drawing Sheets

TIME SYNCHRONIZATION METHOD IN WIRELESS SENSOR NETWORK

CROSS-REFERENCE TO RELATED APPLICATIONS

This application claims priority from Korean Patent Application No. 10-2006-0002454, filed Jan. 9, 2006, in the Korean Intellectual Property Office, the entire contents of which are incorporated herein by reference.

BACKGROUND OF THE INVENTION

1. Field of the Invention

Systems and methods consistent with the present invention relate to a time synchronization method in the wireless sensor network. More particularly, the present invention relates to a time synchronization method in the wireless sensor network, in which an upper node provides back-off scheduling to lower nodes in the wireless sensor network of a hierarchical structure, and each of the lower nodes synchronizes time according to the back-off scheduling based on its local clock.

2. Description of the Related Art

In general, an ad-hoc network is a representative example of a wireless sensor network. The ad-hoc network does not have a central managing system. Instead, the ad-hoc network uses an existing communication-based structure and has a fixed controller for connection between mobile nodes such as a router, a host, and a wireless base station. That is, in the ad-hoc network, a mobile node functions as a router. Therefore, when a mobile node wants to communicate with a counterpart, the mobile node has to develop a communication path via a plurality of nodes between the mobile node and the counterpart.

For example, in an ad-hoc network, there is a wireless network of a tree routing structure. The tree routing structure is widely used due to the strong points of address allocation and routing among functions of the network. That is, in the network of the tree routing structure, addresses are sequentially allocated according to the tree layer, and a packet is transmitted along the tree path.

The ad-hoc network is synchronized by an upper node which functions as a mediator. For example, in the Institute of Electrical and Electronics Engineers (IEEE) 802.11 standards, all of the lower nodes connected to the ad-hoc network can be a mediator which synchronizes the ad-hoc network every beacon frame. In addition, in the 802.15.3 standards, one mediator exists while the ad-hoc network is maintained, and beacons frame periodically generated by the mediator are broadcasted to each of the lower nodes and synchronized.

Thus, an upper node broadcasts data for synchronization to each of the lower nodes, and transmits and receives the data for synchronization to and from each of the lower nodes as many as the number of the lower nodes. For example, if an upper node is connected to lower nodes of a number of n, the upper node uses packets of 2n for synchronization. Accordingly, power consumption increases according to data transmission and reception for synchronization.

Furthermore, as there is no mechanism for managing a synchronization level of the network, only a synchronization technology regardless of synchronization of a desired level exists. Therefore, unnecessarily precise synchronization regardless of a required level of a synchronization error which varies according to an application, and unnecessarily repeated synchronization causes overhead or power loss.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a time synchronization method in the wireless sensor network, in which an upper node provides back-off scheduling to lower nodes in the wireless sensor network of a hierarchical structure, and each of the lower nodes synchronizes time according to the back-off scheduling based on its local clock.

According to an exemplary embodiment of the present invention, a time synchronization method in a wireless sensor network is provided comprising receiving synchronization packet data containing time information broadcasted from an upper node, and starting synchronization by receiving the synchronization packet data, generating response packet data by calculating back-off time using a local clock, and broadcasting the response packet data to the upper node.

The time information comprises time stamp1 information based on the transmission time of the broadcasted synchronization packet data, response duration (RD) information on response time, and a response limit seed (RLS) information on a node to perform synchronization.

The back-off time is calculated as below:

backofftime=(RLS/|T1−Tint|)*RD, where Tint is the time when the synchronization packet data are transmitted, T1 is the time when the synchronization packet data are received, and RD is the response duration time.

In the broadcasting the response packet, the broadcasted response packet data are transmitted to a secondary lower node.

In the broadcasting the response packet, the response packet data contains information on time stamp1, time stamp2, time stamp3, a RD, a RLS and a reference. The time stamp1 corresponds to the time when the synchronization packet data are transmitted, the time stamp2 corresponds to the time when the broadcasted synchronization packet data are received, the time stamp3 corresponds to the time when the response packet data are transmitted, the RD is the response duration time, and the reference is an identification (ID) of a broadcast transmission node.

The upper node collects the response packet data from each of the lower nodes during the response duration time, calculates each offset, and broadcasts at least one packet data containing the time stamp1, the time stamp2 and the offset to each of the lower nodes.

In the broadcasting the response packet, if the response packet data cause a collision during transmission to the upper node and result in synchronization failure, a message overhearing is performed. The message overhearing confirms if there is an adjacent node whose time stamp1, which indicates time when the synchronization packet data are transmitted, is similar to the possessing time stamp1.

Synchronization is performed by recognizing response packet data of an adjacent node whose time stamp1 is similar to the possessing time stamp1 as a user's own synchronization start packet data.

BRIEF DESCRIPTION OF THE DRAWINGS

The above and/or other aspects of the present invention will become more apparent by describing in detail exemplary embodiments thereof with reference to the attached drawing figures, wherein.

DETAILED DESCRIPTION OF THE EXEMPLARY EMBODIMENTS

Figure 1:
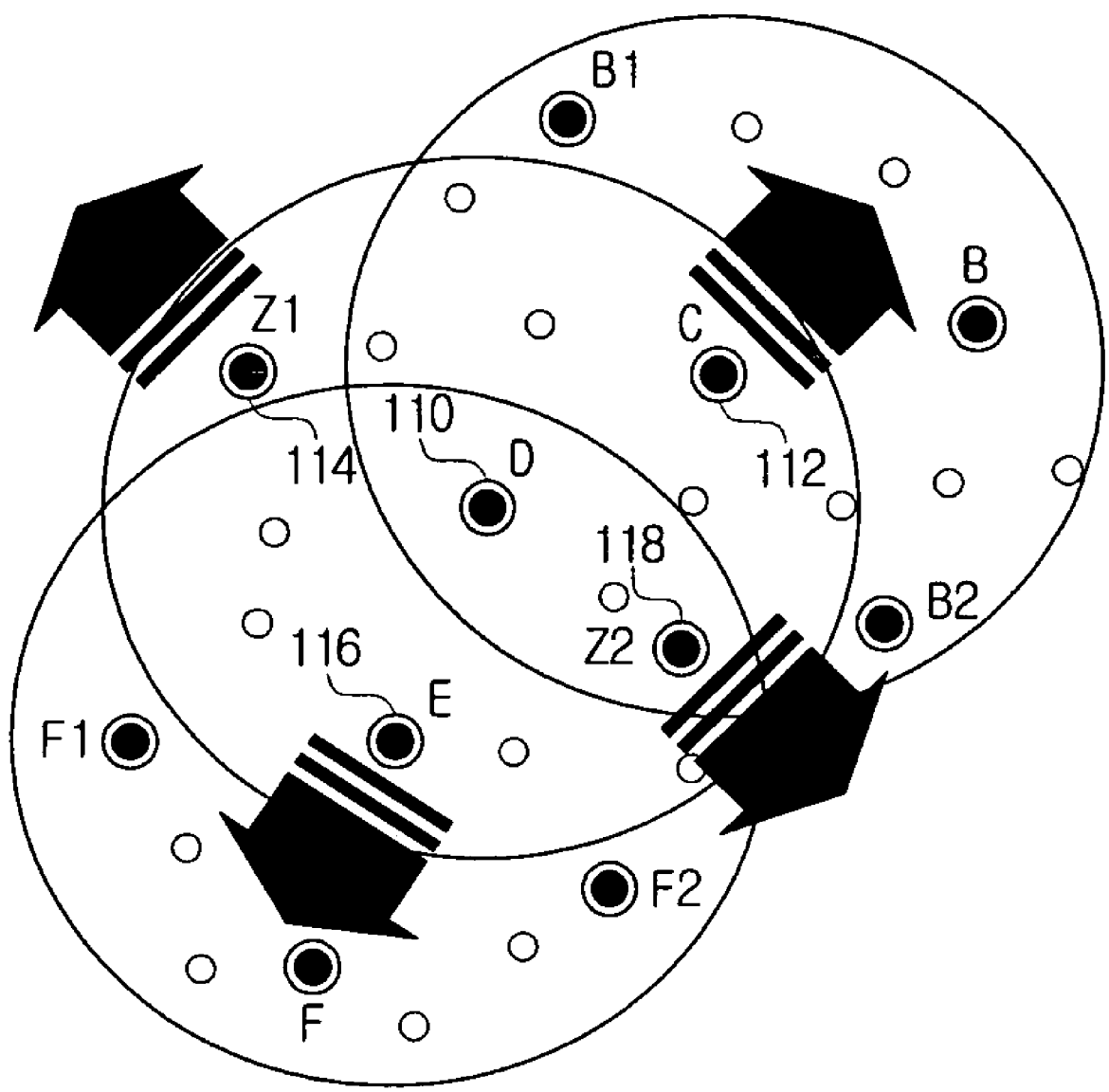
FIG. 1 illustrates the wireless sensor network which adopts a time synchronization method according to an exemplary embodiment of the present invention.

Hereinafter, exemplary embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 illustrates the wireless sensor network which adopts a time synchronization method according to an exemplary embodiment of the present invention.

The wireless sensor network according to an exemplary embodiment of the present invention includes an upper node 110, a first lower node 112, a second lower node 114, a third lower node 116, a fourth lower node 118 and other lower nodes.

The upper node 110 broadcasts synchronization packet data containing time information to synchronize in the wireless sensor network. The synchronization packet data broadcasted by the upper node 110 include a time stamp1, response duration (RD) and a response limit seed (RLS). The time stamp1 indicates information on transmission time of the broadcasted synchronization packet data, and the RD indicates the response duration time, for example, a broadcast period of the upper node. The RLS indicates the level of synchronization error requirement, and includes information on an error range of lower nodes to synchronize. That is, the RLS is a seed to notify a node which can respond by calculating each different back-off time of the lower nodes. For example, if the RLS is 100 seconds, a lower node having an error of 100 or more seconds compared to the upper node can be a node for time synchronization. The RLS enables synchronization management of the network according to the level of synchronization error requirement.

Furthermore, the upper node 110 stands by receiving the response data from the lower node during a response duration preset in the protocol.

The first lower node through the fourth lower node 112 through 118, respectively start synchronization based on the synchronization packet data broadcasted once from the upper node 110. At the time, the first lower node through the fourth lower node 112 through 118, respectively schedule transmission time of a synchronization response packet using its local clock information. That is, the first lower node through the fourth lower node 112 through 118, respectively calculates back-off time using its local clock information after receiving the synchronization packet data. The back-off time is calculated according to Equation 1 below:

$$\text{backofftime} = (RLS/|T1 - Tint|) * RD \quad \text{[Equation 1]}$$

where Tint is the time when the synchronization packet data are transmitted, T1 is the time when the synchronization packet data are received, and the RD is the response duration time.

The first lower node through the fourth lower node 112 through 118, respectively broadcast response packet data within the back-off time after calculating the back-off time. The response packet data includes information such as the time stamp1, a time stamp2, a time stamp3, the RD, the RLS and a reference. The time stamp2 indicates the time when the broadcasted synchronization packet data are received, the time stamp3 indicates the time when the response packet data are transmitted, and the reference indicates the identification (ID) of a broadcast transmission node.

The response packet data which are transmitted from the respective first lower node through the fourth lower node 112 through 118 are used as a synchronization start message to secondary lower nodes. For example, the response packet data broadcasted from the respective first lower node through the fourth lower node 112 through 118 are transmitted to F node, F1 node, F2 node, B node, B1 node and B2 node, which are the secondary lower nodes. The secondary lower nodes respond within the preset response duration.

The upper node 110 collects the responses from each of the lower nodes during the response duration time and calculates each offset. The upper node 110 informs each of the lower nodes of the time stamp1, the time stamp2 and the offset with one packet data.

Subsequently, a time synchronization method according to an exemplary embodiment of the present invention is described with reference to FIGS. 2 through 4.

First, the upper node 110 broadcasts the synchronization packet data for synchronization in the wireless sensor network to each of the lower nodes.

The synchronization packet data contains the time stamp1 which indicates information on transmission time of the broadcasted synchronization packet data, and the RLS which indicates information on response limit objects for the lower nodes to synchronize. If the RLS is 100 seconds, a lower node having an error of 100 or more seconds compared to the upper node can be a node for time synchronization.

Figure 2:
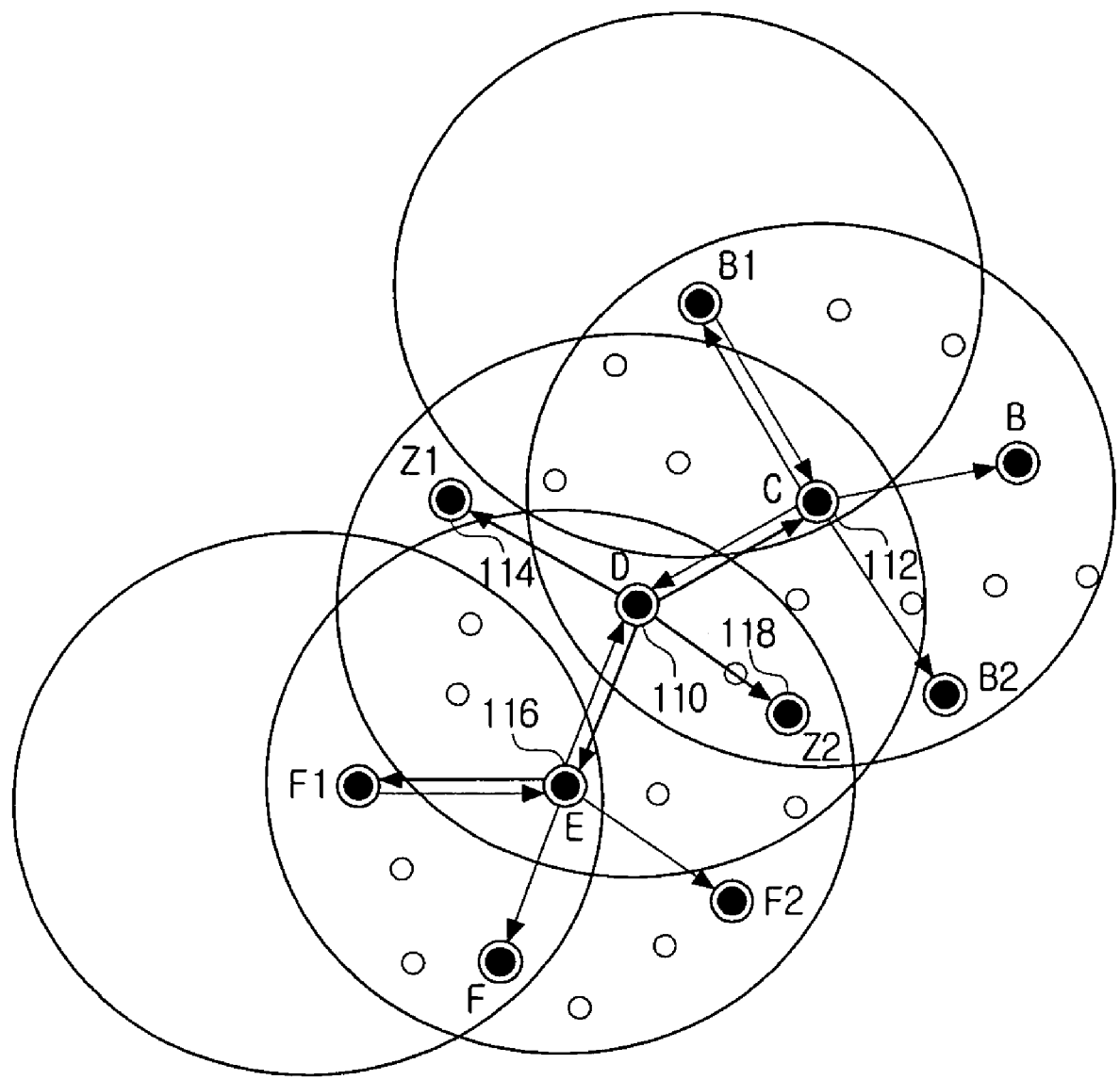
FIG. 2 illustrates a transmission path of synchronization packet data and a transmission path of response packet data in response to the synchronization packet data.

As in FIG. 2, the synchronization packet data broadcasted from the upper node 110 are transmitted to the first lower node 112, the second lower node 114, the third lower node 116, the fourth lower node 118 which correspond to the RLS. It is assumed that the RD is set to 5 seconds.

The first lower node through the fourth lower node 112 through 118, respectively receive the synchronization packet data containing the time information which are broadcasted from the upper node 110 (S402).

Subsequently, the first lower node through the fourth lower node 112 through 118, respectively start synchronization based on the time stamp1 and the RLS contained in the synchronization packet data, and calculate back-off time using its own local clock (S404).

Figure 3:
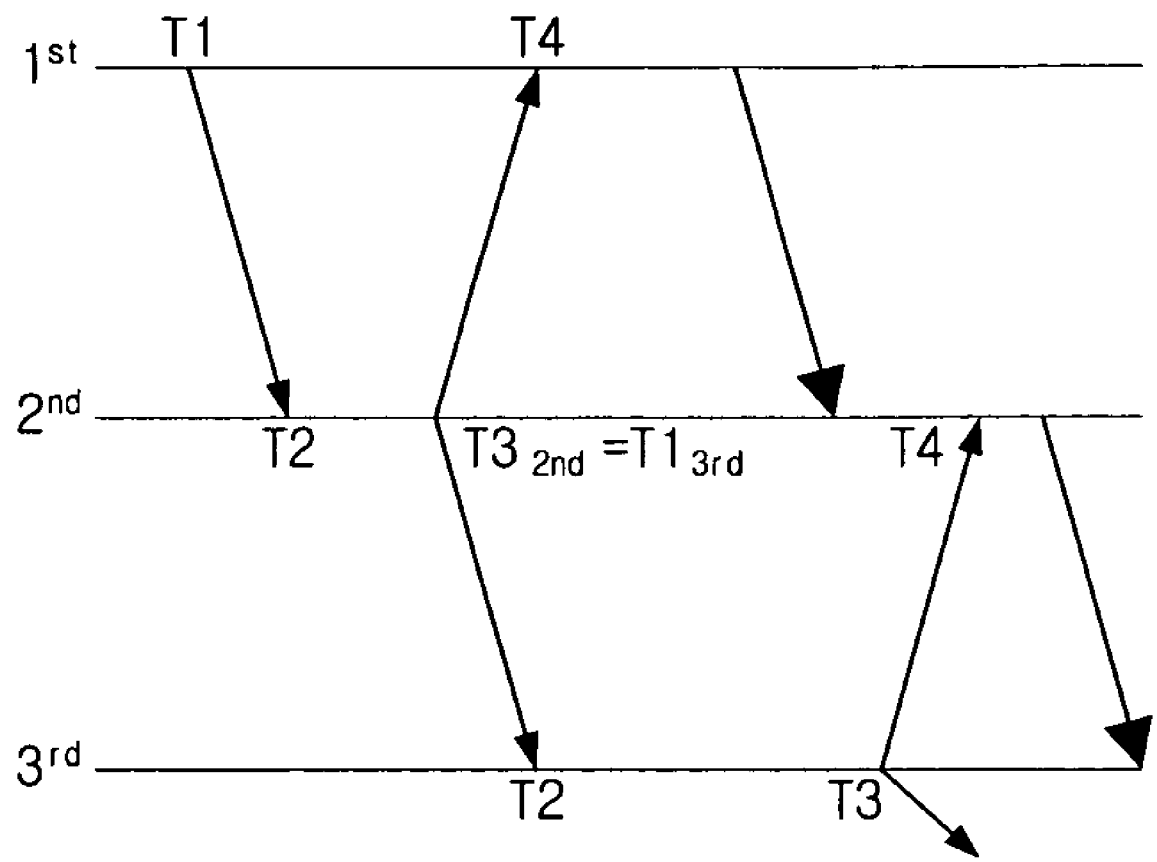
FIG. 3 illustrates the process that the synchronization packet data are transmitted to each node in each layer.
Figure 4:
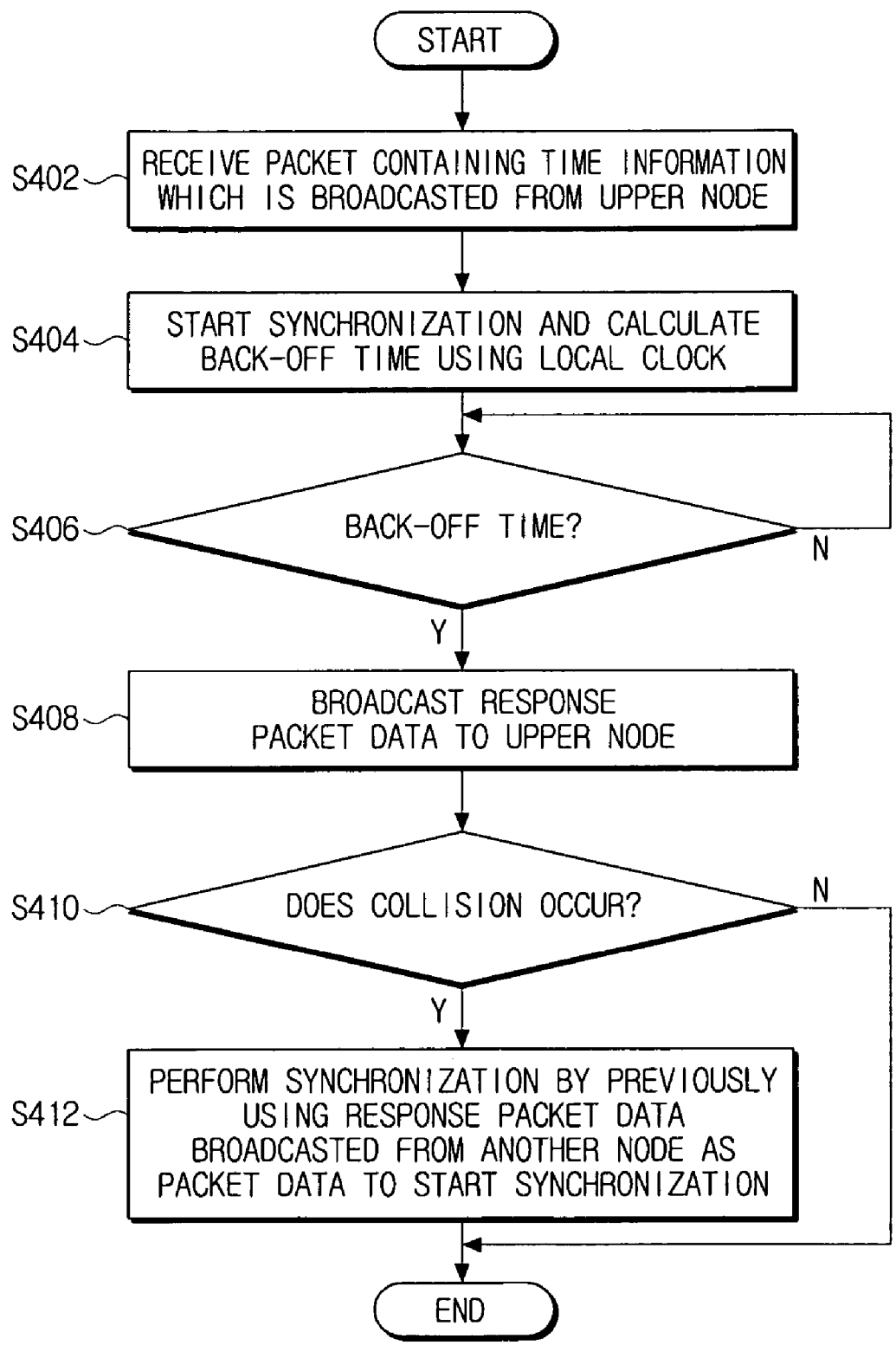
FIG. 4 is a flow chart to describe a time synchronization method in the wireless sensor network according to an exemplary embodiment of the present invention.

As in FIG. 3, the upper node 110 in the first stage transmits synchronization packet data at T1, and the first lower node through the fourth lower node 112 through 118 in the second stage, respectively receive the synchronization packet data at T2.

Next, the first lower node through the fourth lower node 112 through 118 in the second stage, respectively calculate back-off time corresponding to the time between T2 and T3, and perform time synchronization during the back-off time. That is, as in FIG. 3, time synchronization and transmission of response packet data are performed during the time between T2 and T3.

At this time, the first lower node through the fourth lower node 112 through 118, respectively calculate its own back-off time according to Equation 1.

For example, it is assumed that the first lower node receives the synchronization packet data at 0.345 second, the second lower node 114 receives the synchronization packet data at 999999 second, the third lower node 116 receives the synchronization packet data at 135.645 second, and the fourth lower node 118 receives the synchronization packet data at 30.2034 second.

In the case of the first lower node 112, if the absolute difference according to Equation 1 is 29.7574 which is smaller than the RLS, synchronization is not performed.

However, in the case of the second lower node 114, if the absolute difference according to Equation 1 is 999968.8976 which is larger than the RLS, synchronization is performed. Therefore, the second lower node 114 acquires back-off time of 0.0001000031 second which is the RLS divided by the absolute difference.

Additionally, in the case of the third lower node 116, if the absolute difference according to Equation 1 is 105.5426, the third lower node 116 acquires back-off time of 0.947484712 second which is the RLS divided by the absolute difference. In the case of the fourth lower node 118, if the absolute difference according to Equation 1 is 0.101, synchronization is not performed.

Reaching the calculated back-off time (S406), the second lower node 114 and the third lower node 116, respectively generate response packet data and broadcast it to the upper node 110 (S408). That is, the response packet data broadcasted from the third lower node 116 in FIG. 2 are transmitted to the upper node 110 and adjacent secondary lower nodes F, F1 and F2.

In addition, as shown in FIG. 3, the second lower node 114 and the third lower node 116 in the second stage transmit the response packet data at T3 to the upper node 110 in the first stage and the secondary lower nodes F, F1 and F2 in the third stage.

Accordingly, the upper node 110 in the first stage receives the response packet data at T4, and the secondary lower nodes F, F1 and F2 in the third stage receive the response packet data at T2. The $T3_{2nd}$ of the node in the second stage is equal to $T1_{3rd}$ of the secondary lower node in the third stage.

The response packet data contains the time stamp1, the time stamp2, the time stamp3, the RLS, the back-off time (BT) and the reference.

Subsequently, the upper node 110 collects the response packet data from each of the lower nodes during the response duration time, and calculates offset time for each of the lower nodes. Each calculated offset time is included in each packet data together with the time stamp1 and the time stamp2, and broadcasted to each of the lower nodes.

Meanwhile, if a collision occurs when each of the lower nodes transmits the response packet data to the upper node 110 (S410), the corresponding lower node receives response packet data broadcasted from another node which has a time stamp1 similar to the received time stamp1, and performs synchronization by previously using the response packet data broadcasted from another node as packet data to start synchronization (S412).

For example, if the first lower node 112 and the second lower node 114 cause collision while responding to the synchronization packet data from the upper node 110, and result in failure of synchronization, the first lower node 112 and the second lower node 114, respectively recognize response packet data of a node whose T1, when the upper node 110 broadcasts the synchronization packet data, has a value the most similar to its own T1 as its synchronization start packet data by overhearing a message, and perform synchronization.

Additionally, the secondary lower nodes F, F1 and F2 adjacent to the first lower node through the fourth lower node 112 through 118, respectively receive the response packet data broadcasted from the first lower node through the fourth lower node 112 through 118, and calculate back-off time between T2 and T3 as in FIG. 3. The secondary lower nodes F, F1 and F2, respectively generate response packet data at T3, and transmit the response packet data to the first lower node through the fourth lower node 112 through 118 which are their upper node. Therefore, the first lower node through the fourth lower node 112 through 118 function as their upper node to set offset time of each of the secondary nodes and to broadcast the offset time to each of the secondary nodes.

As can be appreciated from the above description, the number of packets required for synchronization in the wireless sensor network can sharply decrease, and life time of the network can increase. Additionally, a response packet from a lower node in response to a synchronization packet from an upper node is used as a synchronization start packet for secondary lower nodes, so that synchronization in the entire network is rapidly processed.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A time synchronization method in a wireless sensor network, the method comprising:

receiving synchronization packet data containing time information broadcasted from an upper node, by a lower node;

starting synchronization by receiving the synchronization packet data;

generating response packet data by calculating back-off time using a local clock, by the lower node; and broadcasting the response packet data to the upper node, wherein the time information comprises time stamp1 information based on transmission time of the broadcasted synchronization packet data, response duration (RD) information on response time, and response limit seed (RLS) information for the lower node to perform synchronization, wherein the RLS information is a seed which notifies the lower node of a response limit object, and, in response to the RLS information, the lower node responds by calculating the back-off time.

2. The method of claim 1, wherein the back-off time is calculated as below:

$$\text{backofftime} = (RLS/|T1 - Tint|) * RD,$$

where Tint is the time when the synchronization packet data are transmitted, T1 is the time when the synchronization packet data are received, RD is the response duration time, and RLS is level of synchronization error requirement.

3. The method of claim 1, wherein in the broadcasting the response packet, the broadcasted response packet data are transmitted to a secondary lower node.

4. The method of claim 1, wherein in the broadcasting the response packet, the response packet data contains information on the time stamp1, a time stamp2, a time stamp3, the response duration (RD) information, the response limit seed (RLS) information and a reference.

5. The method of claim 4, wherein the time stamp1 corresponds to the time when the synchronization packet data are transmitted, the time stamp2 corresponds to the time when the broadcasted synchronization packet data are received, the time stamp3 corresponds to the time when the response packet data are transmitted, the response duration (RD) information corresponds to the response duration time, and the reference is an identification (ID) of a broadcast transmission node.

6. The method of claim 5, wherein the upper node collects the response packet data from each of the lower nodes during the response duration time, calculates each offset, and broadcasts at least one packet data containing the time stamp1, the time stamp2 and the offset to each of the lower nodes.

7. The method of claim 1, wherein in the broadcasting the response packet, if the response packet data cause a collision during transmission to the upper node and result in synchronization failure, a message overhearing is performed.

8. The method of claim 7, wherein the message overhearing confirms if there is an adjacent node whose time stamp1, which indicates time when the synchronization packet data are transmitted, is similar to a time stamp1 of a node that receives the synchronization packet data.

9. The method of claim 8, wherein the synchronization is performed by recognizing response packet data of an adjacent node whose time stamp1 is similar to the possessing time stamp1 as a user's own synchronization start packet data.

* * * * *